(12) United States Patent
Sharma et al.

(10) Patent No.: US 8,110,297 B2
(45) Date of Patent: Feb. 7, 2012

(54) COATED ARTICLE SUPPORTING PHOTOCATALYTIC LAYER AND UV-REFLECTING UNDERLAYER, AND/OR METHOD OF MAKING THE SAME

(75) Inventors: Pramod K. Sharma, Ann Arbor, MI (US); Nathan P. Mellott, Northville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 299 days.

(21) Appl. No.: 12/379,309

(22) Filed: Feb. 18, 2009

(65) Prior Publication Data

US 2010/0209734 A1 Aug. 19, 2010

(51) Int. Cl.
*B32B 15/00* (2006.01)

(52) U.S. Cl. .......... 428/701; 428/702; 428/428

(58) Field of Classification Search .......... 428/701, 428/702
See application file for complete search history.

(56) References Cited

U.S. PATENT DOCUMENTS

| | | | |
|---|---|---|---|
| 5,449,413 A | 9/1995 | Beauchamp et al. | |
| 6,154,311 A * | 11/2000 | Simmons et al. | 359/359 |
| 6,906,463 B2 * | 6/2005 | Hildenbrand et al. | 313/635 |
| 7,169,441 B2 | 1/2007 | Vitt et al. | |
| 2003/0059549 A1 * | 3/2003 | Morrow et al. | 427/421 |
| 2005/0178652 A1 * | 8/2005 | Murphy et al. | 204/192.11 |
| 2007/0128449 A1 | 6/2007 | Taylor et al. | |
| 2007/0254163 A1 | 11/2007 | Veerasamy et al. | |
| 2007/0254164 A1 | 11/2007 | Veerasamy et al. | |

FOREIGN PATENT DOCUMENTS

| | | |
|---|---|---|
| JP | 2001-189809 | 7/2000 |
| JP | 2000-285715 | 10/2000 |

OTHER PUBLICATIONS

Watabe JP2000-189809 English Machine translation www.jpo.com.*
Kamata JP2000-285715 English Machine translation www.jpo.com.*

* cited by examiner

*Primary Examiner* — Timothy Speer
(74) *Attorney, Agent, or Firm* — Nixon & Vanderhye P.C.

(57) ABSTRACT

Certain example embodiments relate to articles supporting photocatalytic layers that also include UV-reflecting underlayers, and/or methods of making the same. In certain example embodiments, the inclusion of a UV-reflecting underlayer surprisingly and unexpectedly results in the reduction of dosing time to enable quick activation of the photocatalytic coating. For example, dosing time may be reduced from a few hours to a few minutes or even seconds in certain example embodiments. The UV-reflecting underlayer may be a single-layer coating or a multi-layer stack.

7 Claims, 2 Drawing Sheets

COATED ARTICLE SUPPORTING PHOTOCATALYTIC LAYER AND UV-REFLECTING UNDERLAYER, AND/OR METHOD OF MAKING THE SAME

FIELD OF THE INVENTION

Certain example embodiments of this invention relate to coated articles supporting photocatalytic layers, and/or methods of making the same. More particularly, certain example embodiments of this invention relate to articles supporting photocatalytic layers that also include UV-reflecting underlayers, and/or methods of making the same. In certain example embodiments, the inclusion of a UV-reflecting underlayer surprisingly and unexpectedly results in the reduction of dosing time to enable quick activation of the photocatalytic coating.

BACKGROUND AND SUMMARY OF EXAMPLE EMBODIMENTS OF THE INVENTION

Semiconductor catalysis, given its oxidative and superhydrophilic nature, is known. Indeed, this technique has attracted a great deal of attention because of the wide range of potential applications for removing toxic organic an inorganic species from coated articles such as, for example, automobile windshields, house windows, building and shower doors, table tops, etc. These photocatalytic coatings also are known as self-cleaning coatings. See, for example, U.S. Publication Nos. 2007/0254164, 2007/0254163, and 2007/0128449, the entire contents of each of which are hereby incorporated herein by reference.

From the discovery of photoinduced water splitting on titanium dioxide ($TiO_2$ or other suitable stoichiometry) electrodes in 1972, titanium dioxide has been widely studied because of its potential photocatalytic applications. When UV-light is illuminated on titanium dixode, electron and hole pairs are generated, and they reduce and oxidize adsorbates on the surface, respectively producing radical species such as OH free radicals and $O_2^-$. These radicals decompose many, if not most, organic compounds. In addition to these advantageous features, it has been observed that the surface of titanium dioxide becomes highly hydrophilic, with a water contact angle near 0 degrees under UV illumination.

The mechanism of photoinduced hydrophilicity, or photocatalytic splitting of water, is based on photogenerated electrons and holes. Electrons are generated in the conduction band, and holes are generated in the valence band. The mechanism can be generally modeled by the following:

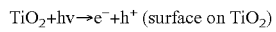
$TiO_2 + h\nu \rightarrow e^- + h^+$ (surface on $TiO_2$)

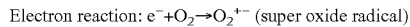
Electron reaction: $e^- + O_2 \rightarrow O_2^{+-}$ (super oxide radical)

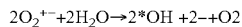
$2O_2^{+-} + 2H_2O \rightarrow 2*OH + 2 - +O2$

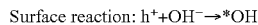
Surface reaction: $h^+ + OH^- \rightarrow *OH$

Titanium dioxide is a good photocatalyzer in terms of reactivity, durability, safety, absorption of UV light, and scratch resistance.

One disadvantage associated with these types of semiconductors, and specifically titanium dioxide, is that given its band gap, UV light is necessary for the desired performance properties. In other words, these types of semiconductors (including titanium dioxide) require photons of energy, which often times are greater than or equal to 3.0 eV (wavelength <413 nm), to be driven. Hence, initiation of UV-illumination is required in order to activate such photocatalytic semiconductors, including photocatalytic titanium dioxide. This initiation typically takes up to a few hours depending on the light source, structure, ingredients, and texture of these coatings. Thus, at least the duration and intensity of the initiating light impacts the dosing time required for activation of the photocatalytic layer.

Thus, it will be appreciated that there is a need in the art for techniques for reducing the dosing time to enable quick activation of photocatalysts. For example, it will be appreciated that it would be desirable o reduce dosing time from a few hours to a few minutes or even seconds.

The inventors of the instant application have discovered a way of significantly reducing the dosing time to enable quick activation of photocatalysts. More particularly, the inventors of the instant application have surprisingly and unexpectedly discovered that providing a UV-reflecting underlayer results in superior reductions to the dosing time to enable quick activation of photocatalysts.

In certain example embodiments of this invention, a method of making a coated article is provided. A substrate to be coated is provided. A UV-reflecting coating is disposed, directly or indirectly, on the substrate to be coated. A photocatalytic layer is disposed over the UV-reflecting coating so that at least some of any UV light that is not initially used in the activation of the photocatalytic layer and otherwise would pass into the substrate is reflected back towards the photocatalytic layer by the UV-reflecting coating.

In certain example embodiments of this invention, a coated article comprising a substrate supporting a coating is provided. A UV-reflecting coating is disposed, directly or indirectly, on the substrate. A photocatalytic layer is disposed over the UV-reflecting coating so that at least some of any UV light that is not initially used in the activation of the photocatalytic layer and otherwise would pass into the substrate is reflected back towards the photocatalytic layer by the UV-reflecting coating.

In certain example embodiments of this invention, a method of making a coated article is provided. A substrate to be coated is provided. A UV-reflecting coating is disposed, directly or indirectly, on the substrate to be coated. A photocatalytic layer is disposed over the UV-reflecting coating so that at least some of any UV light that is not initially used in the activation of the photocatalytic layer and otherwise would pass into the substrate is reflected back towards the photocatalytic layer by the UV-reflecting coating. The photocatalytic layer comprises titanium dioxide. The UV-reflecting coating is disposed so as to reflect at least about 90% of any light useful in photocatalytic initiation coming into contact therewith. The coated article has a visible transmission of at least about 90%.

The features, aspects, advantages, and example embodiments described herein may be combined to realize yet further embodiments.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments of this invention relate to products having antifungal, antimicrobial, photocatalytic, superhydrophilic and/or self-cleaning properties. Using the techniques of certain example embodiments, some or all of the these properties may be improved by disposing a UV-reflecting underlayer between the photocatalytic layer and the substrate supporting the photocatalytic layer. The UV-reflecting underlayer may be any suitable non-metallic, mono-metallic, bi-metallic, or other oxide coating. The photocatalytic layer to be initiated may be a doped or undoped metal oxide such as, for example, titanium oxide (e.g., $TiO_2$ or other suitable stoichiometry), zinc oxide (e.g., ZnO or other suitable stoichiometry), titanium-doped strontium oxide (e.g., $SrTiO_3$), etc.

Figure 1:
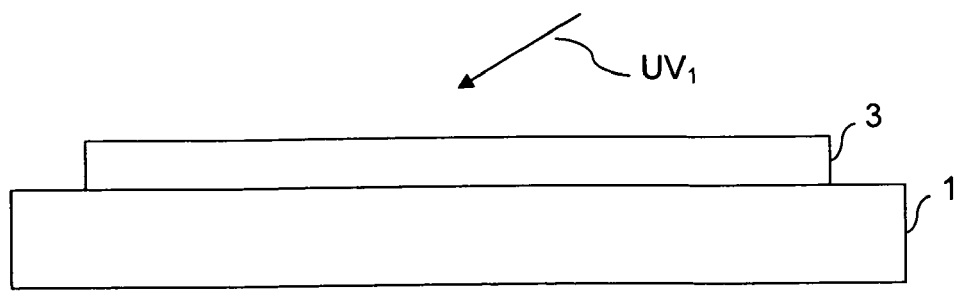
FIG. 1 is a conventional coated article supporting a photocatalytic layer.
Figure 2:
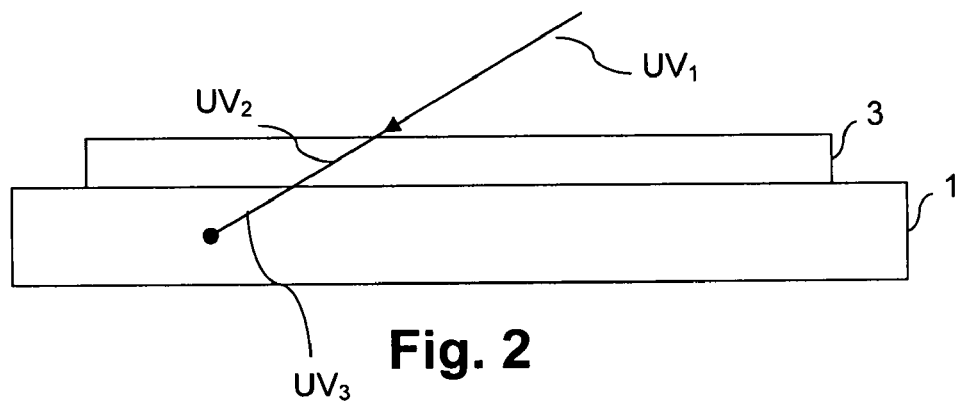
FIG. 2 shows UV light interacting with the coated article of FIG. 1.

FIG. 1 is a conventional coated article I supporting a photocatalytic layer 3, and FIG. 2 shows UV light interacting with the coated article of FIG. 1. As shown in FIGS. 1 and 2, UV light from one or more sources ($UV_1$) approaches the outward facing surface of the photocatalytic layer 3. Some of the UV light enters into the photocatalytic layer 3 ($UV_2$) and aids in the activation of the photocatalytic layer 3 by reducing dosing time. However, much of the UV light passes through the photocatalytic layer 3 and enters into the glass substrate 1, where much of it is absorbed ($UV_3$).

As noted above, it would be desirable to reduce the dosing time to enable quick activation of photocatalysts. The inventors of the instant application have discovered a way of significantly reducing the dosing time to enable quick activation of photocatalysts which, surprisingly and unexpectedly, involves providing a UV-reflecting underlayer (a UV-reflecting coating between the photocatalytic layer and the glass substrate between), which results in superior reductions to the dosing time to enable quick activation of photocatalysts.

With a UV-reflecting underlayer, any UV light that goes through the photocatalytic coating (e.g., a titanium dioxide coating) without absorption will reflect back through for possible absorption. This UV reflection will reduce the dosing time significantly in the coating compared to photocatalytic coating without UV-reflecting coating layers and also will increase photocatalytic activity. Such an arrangement is shown in FIGS. 3 and 4.

Figure 3:
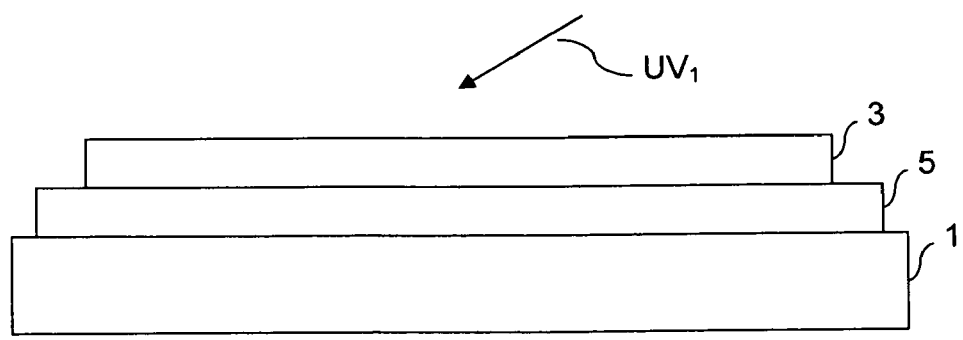
FIG. 3 is a coated article supporting a photocatalytic layer and a UV-reflecting underlayer in accordance with an example embodiment.
Figure 4:
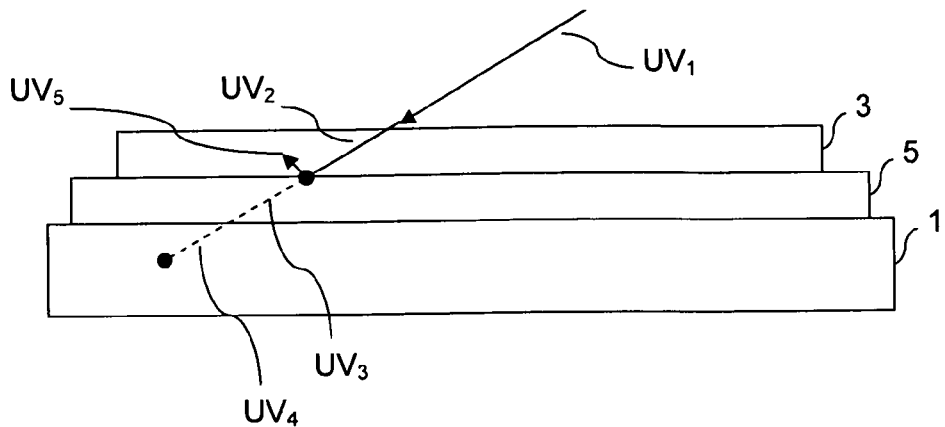
FIG. 4 show UV light interacting with the coated article of FIG. 3.

More particularly, FIG. 3 is a coated article supporting a photocatalytic layer and a UV-reflecting underlayer in accordance with an example embodiment, and FIG. 4 show UV light interacting with the coated article of FIG. 3. As shown in FIGS. 3 and 4, a UV-reflecting coating 5 is disposed between the photocatalytic layer 3 and the glass substrate 1. Thus, similar to the above, UV light from one or more sources ($UV_1$) approaches the outward facing surface of the photocatalytic layer 3. Some of the UV light enters into the photocatalytic layer 3 ($UV_2$) and aids in the activation of the photocatalytic layer 3 by reducing dosing time. However, whereas much of the UV light would otherwise pass through the photocatalytic layer 3 and enter into the glass substrate 1 where much of it is absorbed ($UV_3$ and $UV_4$) using conventional techniques, in certain example embodiments, most (and sometimes all) of the UV light will be reflected back towards the photocatalytic layer 3 when it comes into contact with the UV-reflecting coating 5 ($UV_5$). Thus, only some (and sometimes even none) of the UV light actually passes through the UV-reflecting coating 5 ($UV_3$) and into the glass substrate 1 ($UV_4$) for possible absorption.

Because of this reflection, UV light that otherwise would be "wasted" by simply passing through the photocatalytic layer 3 is put to use, since it is reflected back towards the photocatalytic layer 3. Accordingly, the existing UV light may be thought of as being put to use with greater efficiently, since it is redirected towards the photocatalytic layer 3 for use instead of simply being absorbed by the glass substrate 1. This arrangement surprisingly and unexpectedly reduces the dosing time to enable quick activation of photocatalysts, e.g., from one or more hours to several minutes or even seconds in certain example embodiments.

Figure 5:
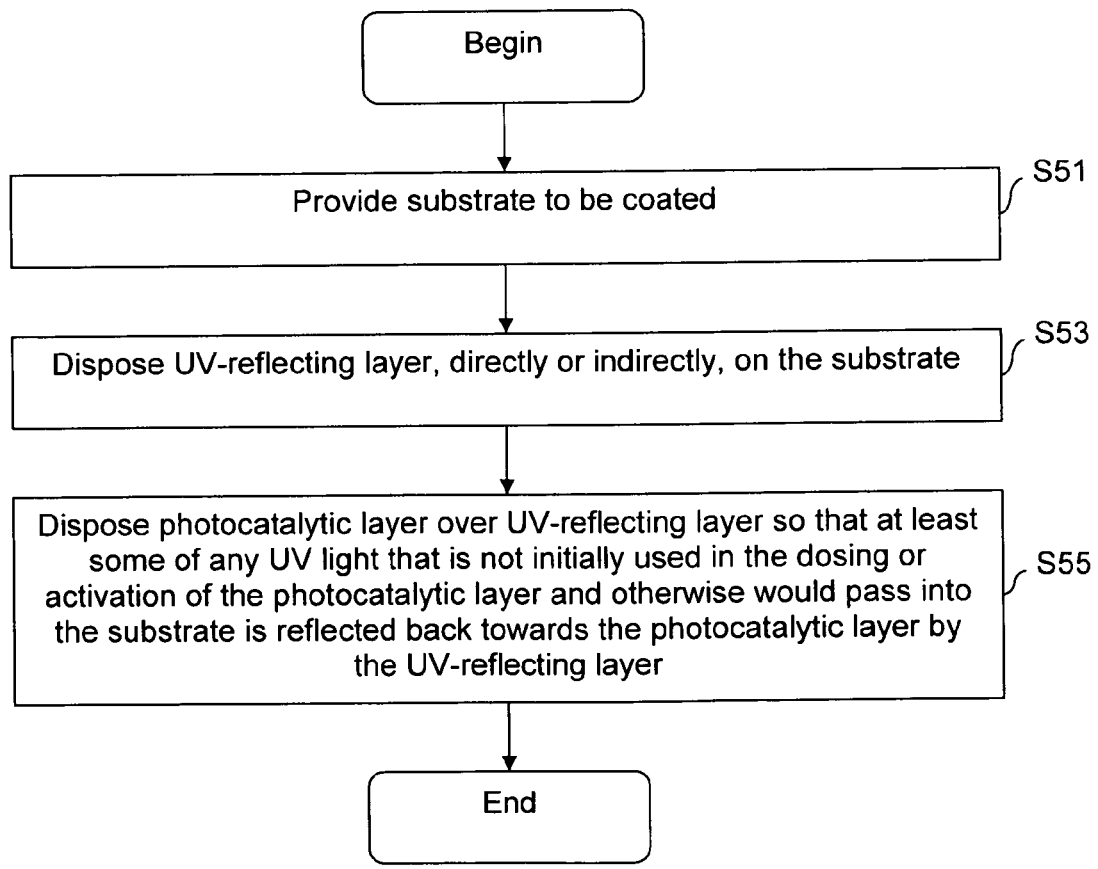
FIG. 5 is a flowchart showing an illustrative process for making the coated article of FIG. 3 in accordance with an example embodiment.

FIG. 5 is a flowchart showing an illustrative process for making the coated article of FIG. 3 in accordance with an example embodiment. A substrate to be coated is provided in step S51. The substrate may be a glass substrate or any other suitable transparent substrate. A UV-reflecting coating is disposed, directly or indirectly, on the substrate in step S53. In step S55, a photocatalytic layer is disposed over the UV-reflecting coating so that at least some of any UV light that is not initially used in the activation of the photocatalytic layer and otherwise would pass into the substrate is reflected back towards the photocatalytic layer by the UV-reflecting coating. Accordingly, it is possible to obtain a coated article that reduces the dosing time to enable quick activation of photocatalysts, e.g., from one or more hours to several minutes or even seconds in certain example embodiments.

Preferably, the UV-reflecting coating of certain example embodiments will keep transmission of UV light useful in initiation below about 10%, more preferably below about 8%, more preferably below about 5% transmission, and still more preferably below about <3%. In other words, in certain example embodiments, the reflection of UV light useful in initiation preferably will be at least about 90%, more preferably at least about 92%, more preferably at least about 95%, and still more preferably at least about 97%. Generally, UV light useful in initiation is light having an energy per photon of about 3-5 eV, which corresponds to UV light within the range of about 250-400 nm. However, it will be appreciated that different wavelengths that are higher or lower than this range also may be used, which light also may have an energy per photon outside of the above-noted range. Despite the high reflection of the UV light useful in initiation, transmission of visible light (e.g., light having a wavelength of about 400-700 nm) preferably will remain high. For example, in certain example embodiments, visible light transmission preferably is greater than 50%, more preferably greater than 65%, still more preferably greater than 70%, and most preferably greater than 90%, at least depending on the application.

EXAMPLE 1

As noted above, the UV-reflecting underlayer may be a single or monolithic layer. Accordingly, in this example, the bottom UV-reflecting coating may comprise at least 0.1% by weight aluminum oxide (e.g., $Al_2O_3$ or other suitable stoichiometry), and at least 0.1% by weight material having a higher refractive index than the aluminum oxide so that as large a portion of the UV light as possible is reflected and as large a portion of visible light as possible can be emitted. One suitable coating of this sort is described in U.S. Pat. No. 6,906, 463, the entire contents of which is hereby incorporated herein by reference. The higher index materials may include, for example, zirconium oxide, yttrium oxide, hafnium oxide, oxides of rare earth metals, etc.

EXAMPLE 2

As noted above, the UV-reflecting underlayer may be a multilayer structure. Accordingly, in this example, the UV-reflecting coating may comprise a multilayer stack based on materials having matching or substantially matching refractive indexes. For example, U.S. Pat. Nos. 7,169,441 and 5,449,413 disclose various examples of acceptable multilayer coatings that reflect most solar radiations having wavelengths shorter than 350 nm. The entire contents of both U.S. Pat. Nos. 7,169,441 and 5,449,413 are hereby incorporated herein by reference.

Advantageously, using the techniques of certain example embodiments enables the lifetime of the photocatalytic coating to be extended. It is also noted that the glass substrate may be heat treated in certain example embodiments so that the glass substrate is either heat strengthened (e.g., at a temperature of at least about 200 degrees C., more preferably at least about 250 degrees C.) or thermally tempered (e.g., at a temperature of at least about 580 degrees C., more preferably at least about 600 degrees C., and often at least about 620 or 640 degrees C.). In certain example embodiments, the glass substrate may be heat treated (e.g., heat strengthened or thermally tempered) before or after the UV-reflecting coating and/or the photocatalytic coating have been applied thereto.

Although certain example embodiments have been described in relation to reducing dosing time, it will be appreciated that certain example embodiments may be used to reduce the intensity of required UV light, e.g., while maintaining or only slightly reducing the actual time involved in the activation of the photocatalytic layer.

While a particular layer or coating may be said to be "on" or "supported by" a surface or another coating (directly or indirectly), other layer(s) and/or coatings may be provided therebetween. Thus, for example, a coating may be considered "on" and "supported by" a surface even if other layer(s) are provided between layer(s) and the substrate. Moreover, certain layers or coatings may be removed in certain embodiments, while others may be added in other embodiments of this invention without departing from the overall spirit of certain embodiments of this invention. Thus, by way of example, an encapsulating coating applied in liquid sol-gel form in accordance with an example embodiment may be said to be "on" or "supported by" a sputtering target material, even though other coatings and/or layers may be provided between the sol-gel formed coating and the target material.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article comprising a substrate supporting a coating, the coating comprising:
   a UV-reflecting coating disposed, directly or indirectly, on the substrate, wherein the UV-reflecting coating comprises at least 0.1% by weight aluminum oxide, and at least 0.1% by weight material having a refractive index higher than the aluminum oxide, and wherein the material having the refractive index higher than the aluminum oxide includes at least one: zirconium oxide, yttrium oxide, hafnium oxide, and oxides of rare earth metals; and
   a photocatalytic layer disposed over the UV-reflecting coating so that at least some of any UV light that is not initially used in the activation of the photocatalytic layer and otherwise would pass into the substrate is reflected back towards the photocatalytic layer by the UV-reflecting coating.

2. The coated article of claim 1, wherein the photocatalytic layer comprises titanium dioxide.

3. The coated article of claim 1, wherein the UV-reflecting coating is a single layer coating.

4. The coated article of claim 1, wherein the UV-reflecting coating is a multilayer stack, each layer in the multilayer stack being selected so that it has a refractive index that substantially matches each of the other layers in the multilayer stack.

5. The coated article of claim 1, wherein the UV-reflecting coating is disposed so as to reflect at least about 90% of any light useful in photocatalytic initiation coming into contact therewith.

6. The coated article of claim 1, wherein the UV-reflecting coating is disposed so as to reflect at least about 90% of any light having an energy per photon greater than about 3 eV.

7. The coated article of claim 1, wherein the coated article has a visible transmission of at least about 90%.

* * * * *